United States Patent
Zhao et al.

(10) Patent No.: US 11,901,757 B2
(45) Date of Patent: Feb. 13, 2024

(54) ELECTRIC VEHICLE BATTERY VOLTAGE REGULATION SYSTEM AND CONTROL METHOD AND CONTROL APPARATUS THEREFOR

(71) Applicant: CONTEMPORARY AMPEREX TECHNOLOGY CO., LIMITED, Fujian (CN)

(72) Inventors: Yuanmiao Zhao, Fujian (CN); Xiaojian Huang, Fujian (CN); Zhanliang Li, Fujian (CN); Yu Yan, Fujian (CN); Xinwei Chen, Fujian (CN); Zhimin Dan, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/229,681

(22) Filed: Aug. 3, 2023

(65) Prior Publication Data
US 2023/0378791 A1    Nov. 23, 2023

Related U.S. Application Data

(63) Continuation of application No. PCT/CN2022/079939, filed on Mar. 9, 2022.

(51) Int. Cl.
*H02J 7/00* (2006.01)
*B60L 50/60* (2019.01)
*B60L 50/51* (2019.01)

(52) U.S. Cl.
CPC ............ *H02J 7/007* (2013.01); *B60L 50/60* (2019.02); *B60L 50/51* (2019.02); *B60L 2220/40* (2013.01); *H02J 7/0024* (2013.01)

(58) Field of Classification Search
CPC ......... H02J 7/007; H02J 7/0024; B60L 50/51; B60L 50/60; B60L 2220/40
(Continued)

(56) References Cited

U.S. PATENT DOCUMENTS

| | | | | |
|---|---|---|---|---|
| 2009/0128158 | A1* | 5/2009 | Kawai | B60L 58/12 324/433 |
| 2016/0339796 | A1* | 11/2016 | Angrick | B60K 6/485 |
| 2018/0105060 | A1* | 4/2018 | Mcquillen | B60L 58/21 |

FOREIGN PATENT DOCUMENTS

| | | |
|---|---|---|
| CN | 210760284 U | 6/2020 |
| CN | 112910037 A | 6/2021 |

(Continued)

OTHER PUBLICATIONS

International Search Report and Written Opinion dated Sep. 26, 2022, received for PCT Application PCT/CN2022/079939, filed on Mar. 9, 2022, 17 pages including English Translation.
(Continued)

*Primary Examiner* — Edward Tso
*Assistant Examiner* — Aaron Piggush
(74) *Attorney, Agent, or Firm* — XSENSUS LLP

(57) ABSTRACT

A control method may include: controlling a first switch, a second switch, a third switch, a fourth switch, a fifth switch, a first leg, and a second leg set to turn on or off, to form in a first period a circuit loop for a charge/discharge module to discharge to a motor and to form in a second period a circuit loop for the charge/discharge module and the motor to charge a first electric vehicle battery group and a second electric vehicle battery group or form in the second period a circuit loop for the motor to charge the first electric vehicle battery group and the second electric vehicle battery group.

18 Claims, 5 Drawing Sheets

(58) Field of Classification Search
USPC .................. 320/103, 119, 128, 158, 163, 104
See application file for complete search history.

(56) References Cited

FOREIGN PATENT DOCUMENTS

| CN | 112937332 A | 6/2021 |
| CN | 113783263 A | 12/2021 |
| CN | 113872284 A | 12/2021 |
| CN | 114074561 A | 2/2022 |
| WO | 93/01650 A1 | 1/1993 |

OTHER PUBLICATIONS

International Search Report and Written Opinion dated Nov. 23, 2022, received for PCT Application PCT/CN2022/087185, filed on Apr. 15, 2022, 15 pages including English Translation.

* cited by examiner

400

Control a first switch, a second switch, a third switch, a fourth switch, a fifth switch, a first leg, and a second leg set to turn on or off, to form in a first period a circuit loop for a charge/discharge module to discharge to a motor and to form in a second period a circuit loop for the charge/discharge module and the motor to charge a first electric vehicle battery group and a second electric vehicle battery group or form in the second period a circuit loop for the motor to charge the first electric vehicle battery group and the second electric vehicle battery group ⸺ S410

Control the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module or form in the fourth period a circuit loop for the motor to discharge to the charge/discharge module ⸺ S420

FIG. 5

ELECTRIC VEHICLE BATTERY VOLTAGE REGULATION SYSTEM AND CONTROL METHOD AND CONTROL APPARATUS THEREFOR

CROSS-REFERENCE TO RELATED APPLICATION

The present application is a continuation of International Application No. PCT/CN2022/079939, filed Mar. 9, 2022, which is incorporated herein by reference in its entirety.

TECHNICAL FIELD

This application relates to the field of battery technologies, especially to an electric vehicle battery voltage regulation system and a control method and control apparatus therefor.

BACKGROUND

With the aggravation of energy shortage and environmental pollution problems in modern society, electric vehicles as new energy vehicles have received wide attention from all walks of life upon their introduction. However, the issue of charging and discharging has always been a major limiting factor in their development.

Therefore, ensuring effective charging and discharging of electric vehicle batteries is an urgent problem to be solved.

SUMMARY

Embodiments of this application provide an electric vehicle battery voltage regulation system and a control method and control apparatus therefor, which can effectively ensure charging and discharging of electric vehicle batteries.

According to a first aspect, a control method for an electric vehicle battery voltage regulation system is provided. The electric vehicle battery voltage regulation system includes an electric vehicle battery, a motor, a bridge module, and a switch assembly; where the electric vehicle battery includes a first electric vehicle battery group and a second electric vehicle battery group; the bridge module includes a first leg and a second leg set, the first leg and all legs in the second leg set each include an upper leg and a lower leg, a joint between the upper leg and the lower leg of the first leg is connected to a joint of all windings of the motor, and joints between upper legs and lower legs of all the legs in the second leg set are connected to all the windings of the motor, respectively; and the switch assembly includes a first switch, a second switch, a third switch, a fourth switch, and a fifth switch, where one end of the first switch is connected to a positive terminal of a charge/discharge module, the other end of the first switch is connected to the upper leg of the first leg, one end of the second switch is connected to a joint of the upper legs of all the legs in the second leg set, the other end of the second switch is connected to a positive terminal of the first electric vehicle battery group, one end of the third switch is connected to the lower leg of the first leg, the other end of the third switch is connected to a negative terminal of the charge/discharge module, one end of the fourth switch is connected to a negative terminal of the first electric vehicle battery group, the other end of the fourth switch is connected to a positive terminal of the second electric vehicle battery group, one end of the fifth switch is connected to the negative terminal of the first electric vehicle battery group, and the other end of the fifth switch is connected to a joint of the lower legs of all the legs in the second leg set; and the control method includes: controlling the first switch, the second switch, the third switch, the fourth switch, the fifth switch, the first leg, and the second leg set to turn on or off, to form in a first period a circuit loop for the charge/discharge module to discharge to the motor and to form in a second period a circuit loop for the charge/discharge module and the motor to charge the first electric vehicle battery group and the second electric vehicle battery group or form in the second period a circuit loop for the motor to charge the first electric vehicle battery group and the second electric vehicle battery group; or controlling the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module or form in the fourth period a circuit loop for the motor to discharge to the charge/discharge module.

With the first switch, the second switch, the third switch, the fourth switch, the fifth switch, the first leg, and the second leg set controlled to turn on or off, a variety of charging and discharging circuit loops are formed among the electric vehicle battery, the motor, the bridge module, the switch assembly, and the charge/discharge module. As a result, the charging and discharging states of the electric vehicle battery are controlled, along with the voltage magnitude of the electric vehicle battery throughout the charging or discharging process. This allows for flexible charging and discharging of the electric vehicle battery, meeting charging and discharging needs of the electric vehicle battery under different conditions, thereby effectively ensuring the charging and discharging of the electric vehicle battery.

In a possible implementation, the controlling the first switch, the second switch, the third switch, the fourth switch, the fifth switch, the first leg, and the second leg set to turn on or off, to form in a first period a circuit loop for the charge/discharge module to discharge to the motor and to form in a second period a circuit loop for the charge/discharge module and the motor to charge the first electric vehicle battery group and the second electric vehicle battery group includes: controlling, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop including the upper leg of the first leg, all the windings of the motor, all the lower legs of the second leg set, and the charge/discharge module, for the charge/discharge module to discharge to the motor; and controlling, in the second period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop including the upper leg of the first leg, all the windings of the motor, all the upper legs of the second leg set, the first electric vehicle battery group, the second electric vehicle battery group, and the charge/discharge module, for the charge/discharge module and the motor to charge the first electric vehicle battery group and the second electric vehicle battery group.

In the first period, with the first switch, the second switch, the third switch, and the fourth switch controlled to turn on, the fifth switch controlled to turn off, the upper leg of the first leg and all the lower legs of the second leg set controlled to turn on, and the lower leg of the first leg and all the upper legs of the second leg set controlled to turn off, the circuit loop for the charge/discharge module to discharge to the motor is formed. In this way, in the first period, the charge/discharge module discharges to the motor, and the motor stores energy. In the second period, with the first switch, the second switch, the third switch, and the fourth switch controlled to turn on, the fifth switch controlled to turn off, the upper leg of the first leg and all the upper legs of the second leg set controlled to turn on, and the lower leg of the first leg and all the lower legs of the second leg set controlled to turn off, the circuit loop for both the charge/discharge module and the motor to charge the first electric vehicle battery group and the second electric vehicle battery group is formed. In this way, in the second period, the motor releases the energy stored in the first period to charge the first electric vehicle battery group and the second electric vehicle battery group, and the charge/discharge module also charges the first electric vehicle battery group and the second electric vehicle battery group, thereby achieving voltage-boost charging for the first electric vehicle battery group and the second electric vehicle battery group.

In a possible implementation, the controlling the first switch, the second switch, the third switch, the fourth switch, the fifth switch, the first leg, and the second leg set to turn on or off, to form in a first period a circuit loop for the charge/discharge module to discharge to the motor and to form in the second period a circuit loop for the motor to charge the first electric vehicle battery group and the second electric vehicle battery group includes: controlling, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop including the upper leg of the first leg, all the windings of the motor, all the lower legs of the second leg set, and the charge/discharge module, for the charge/discharge module to discharge to the motor; and controlling, in the second period, the first switch, the second switch, the third switch, and the fourth switch to turn on, the fifth switch to turn off, the lower leg of the first leg, and all the upper legs of the second leg set to turn on, and the upper leg of the first leg and all the lower legs of the second leg set to turn off, to form a circuit loop including the lower leg of the first leg, all the windings of the motor, all the upper legs of the second leg set, the first electric vehicle battery group, and the second electric vehicle battery group, for the motor to charge the first electric vehicle battery group and the second electric vehicle battery group.

In the first period, with the first switch, the second switch, the third switch, and the fourth switch controlled to turn on, the fifth switch controlled to turn off, the upper leg of the first leg and all the lower legs of the second leg set controlled to turn on, and the lower leg of the first leg and all the upper legs of the second leg set controlled to turn off, the circuit loop for the charge/discharge module to discharge to the motor is formed. In this way, in the first period, the charge/discharge module discharges to the motor, and the motor stores energy. In the second period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the motor to charge the first electric vehicle battery group and the second electric vehicle battery group is formed. In this way, in the second period, the motor releases the energy stored in the first period to charge the first electric vehicle battery group and the second electric vehicle battery group, that is, instead of directly charging the first electric vehicle battery group and the second electric vehicle battery group, first, the charge/discharge module discharges to the motor, and then the motor charges the first electric vehicle battery group and the second electric vehicle battery group, achieving voltage-reduction charging for the first electric vehicle battery group and the second electric vehicle battery group.

In a possible implementation, the controlling the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module includes: controlling, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop including the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and controlling, in the fourth period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop including the upper leg of the first leg, all the windings of the motor, all the upper legs of the second leg set, the first electric vehicle battery group, the second electric vehicle battery group, and the charge/discharge module, for the first electric vehicle battery group, the second electric vehicle battery group, and the motor to discharge to the charge/discharge module.

In the third period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the first electric vehicle battery group and the second electric vehicle battery group to discharge to the motor is formed. In this way, in the third period, the first electric vehicle battery group and the second electric vehicle battery group discharge to the motor, and the motor stores energy. In the fourth period, with the first switch, the second switch, the third switch, and the fourth switch controlled to turn on, the fifth switch controlled to turn off, the upper leg of the first leg and all the upper legs of the second leg set controlled to turn on, and the lower leg of the first leg and all the lower legs of the second leg set controlled to turn off, the circuit loop for the first electric vehicle battery group, the second electric vehicle battery group, and the motor to discharge to the charge/discharge module is formed. In this way, in the fourth period, the motor releases the energy stored in the third period to discharge to the charge/discharge module, and the first electric vehicle battery group and the second electric vehicle battery group also discharge to the charge/discharge module, achieving voltage-boost discharging for the first electric vehicle battery group and the second electric vehicle battery group.

In a possible implementation, the controlling the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in the fourth period a circuit loop for the motor to discharge to the charge/discharge module includes: controlling, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop including the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and controlling, in the fourth period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop including the upper leg of the first leg, all the windings of the motor, all the lower legs of the second leg set, and the charge/discharge module, for the motor to discharge to the charge/discharge module.

In the third period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the first electric vehicle battery group and the second electric vehicle battery group to discharge to the motor is formed. In this way, in the third period, the first electric vehicle battery group and the second electric vehicle battery group discharge to the motor, and the motor stores energy. In the fourth period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the motor to discharge to the charge/discharge module. In this way, in the fourth period, the motor releases the energy stored in the third period and discharges to the charge/discharge module is formed, that is, instead of directly discharging to the charge/discharge module, first, the first electric vehicle battery group and the second electric vehicle battery group discharge to the motor, and then the motor discharges to the charge/discharge module, achieving voltage-reduction discharging for the first electric vehicle battery group and the second electric vehicle battery group.

In a possible implementation, the first period and the second period are alternately distributed, and/or the third period and the fourth period are alternately distributed.

The energy stored by the motor in the first period is released in the second period, resulting in a gradual decrease in energy. Therefore, it is necessary for the motor to continuously store energy, that is, the first period and the second period are alternately distributed so that the motor cycles through energy storage, energy release, subsequent energy storage, and further energy release. This can ensure that the motor maintains a stable energy level, sufficient for charging the first electric vehicle battery group and the second electric vehicle battery group or for discharging to the charge/discharge module. Likewise, the third period and the fourth period are also alternately distributed.

In a possible implementation, currents flowing through all the windings of the motor have equal magnitudes and identical phases.

The currents flowing through all the windings of the motor are controlled to have equal magnitudes and identical phases, so that the vibration noise of the motor can be effectively suppressed when the circuit loop of the motor is used for charging or discharging the electric vehicle battery. In addition, the electric vehicle battery voltage regulation system provided in this application does not cause the motor to operate and can solve the issue of heat generation in the motor rotor.

In a possible implementation, the motor is a three-phase motor.

According to a second aspect, an electric vehicle battery voltage regulation system is provided, where the electric vehicle battery voltage regulation system includes an electric vehicle battery, a motor, a bridge module, a switch assembly, and a control module; the electric vehicle battery includes a first electric vehicle battery group and a second electric vehicle battery group; the bridge module includes a first leg and a second leg set, the first leg and all legs in the second leg set each include an upper leg and a lower leg, a joint between the upper leg and the lower leg of the first leg is connected to a joint of all windings of the motor, and joints between upper legs and lower legs of all the legs in the second leg set are connected to all the windings of the motor, respectively; and the switch assembly includes a first switch, a second switch, a third switch, a fourth switch, and a fifth switch, where one end of the first switch is connected to a positive terminal of a charge/discharge module, the other end of the first switch is connected to the upper leg of the first leg, one end of the second switch is connected to a joint of the upper legs of all the legs in the second leg set, the other end of the second switch is connected to a positive terminal of the first electric vehicle battery group, one end of the third switch is connected to the lower leg of the first leg, the other end of the third switch is connected to a negative terminal of the charge/discharge module, one end of the fourth switch is connected to a negative terminal of the first electric vehicle battery group, the other end of the fourth switch is connected to a positive terminal of the second electric vehicle battery group, one end of the fifth switch is connected to the negative terminal of the first electric vehicle battery group, and the other end of the fifth switch is connected to a joint of the lower legs of all the legs in the second leg set; and the control module is configured to: control the first switch, the second switch, the third switch, the fourth switch, the fifth switch, the first leg, and the second leg set to turn on or off, to form in a first period a circuit loop for the charge/discharge module to discharge to the motor and to form in a second period a circuit loop for the charge/discharge module and the motor to charge the first electric vehicle battery group and the second electric vehicle battery group or form in the second period a circuit loop for the motor to charge the first electric vehicle battery group and the second electric vehicle battery group; or control the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module or form in the fourth period a circuit loop for the motor to discharge to the charge/discharge module.

With the first switch, the second switch, the third switch, the fourth switch, the fifth switch, the first leg, and the second leg set controlled to turn on or off, a variety of charging and discharging circuit loops are formed among the electric vehicle battery, the motor, the bridge module, the switch assembly, and the charge/discharge module. As a result, the charging and discharging states of the electric vehicle battery are controlled, along with the voltage magnitude of the electric vehicle battery throughout the charging or discharging process. This allows for flexible charging and discharging of the electric vehicle battery, meeting charging and discharging needs of the electric vehicle battery under different conditions, thereby effectively ensuring the charging and discharging of the electric vehicle battery.

In a possible implementation, the control module is configured to: control, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop including the upper leg of the first leg, all the windings of the motor, all the lower legs of the second leg set, and the charge/discharge module, for the charge/discharge module to discharge to the motor; and control, in the second period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop including the upper leg of the first leg, all the windings of the motor, all the upper legs of the second leg set, the first electric vehicle battery group, the second electric vehicle battery group, and the charge/discharge module, for the charge/discharge module and the motor to charge the first electric vehicle battery group and the second electric vehicle battery group.

In the first period, with the first switch, the second switch, the third switch, and the fourth switch controlled to turn on, the fifth switch controlled to turn off, the upper leg of the first leg and all the lower legs of the second leg set controlled to turn on, and the lower leg of the first leg and all the upper legs of the second leg set controlled to turn off, the circuit loop for the charge/discharge module to discharge to the motor is formed. In this way, in the first period, the charge/discharge module discharges to the motor, and the motor stores energy. In the second period, with the first switch, the second switch, the third switch, and the fourth switch controlled to turn on, the fifth switch controlled to turn off, the upper leg of the first leg and all the upper legs of the second leg set controlled to turn on, and the lower leg of the first leg and all the lower legs of the second leg set controlled to turn off, the circuit loop for both the charge/discharge module and the motor to charge the first electric vehicle battery group and the second electric vehicle battery group is formed. In this way, in the second period, the motor releases the energy stored in the first period to charge the first electric vehicle battery group and the second electric vehicle battery group, and the charge/discharge module also charges the first electric vehicle battery group and the second electric vehicle battery group, thereby achieving voltage-boost charging for the first electric vehicle battery group and the second electric vehicle battery group.

In a possible implementation, the control module is configured to: control, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop including the upper leg of the first leg, all the windings of the motor, all the lower legs of the second leg set, and the charge/discharge module, for the charge/discharge module to discharge to the motor; and control, in the second period, the first switch, the second switch, the third switch, and the fourth switch to turn on, the fifth switch to turn off, the lower leg of the first leg, and all the upper legs of the second leg set to turn on, and the upper leg of the first leg and all the lower legs of the second leg set to turn off, to form a circuit loop including the lower leg of the first leg, all the windings of the motor, all the upper legs of the second leg set, the first electric vehicle battery group, and the second electric vehicle battery group, for the motor to charge the first electric vehicle battery group and the second electric vehicle battery group.

In the first period, with the first switch, the second switch, the third switch, and the fourth switch controlled to turn on, the fifth switch controlled to turn off, the upper leg of the first leg and all the lower legs of the second leg set controlled to turn on, and the lower leg of the first leg and all the upper legs of the second leg set controlled to turn off, the circuit loop for the charge/discharge module to discharge to the motor is formed. In this way, in the first period, the charge/discharge module discharges to the motor, and the motor stores energy. In the second period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the motor to charge the first electric vehicle battery group and the second electric vehicle battery group is formed. In this way, in the second period, the motor releases the energy stored in the first period to charge the first electric vehicle battery group and the second electric vehicle battery group, that is, instead of directly charging the first electric vehicle battery group and the second electric vehicle battery group, first, the charge/discharge module discharges to the motor and then the motor charges the first electric vehicle battery group and the second electric vehicle battery group, achieving voltage-reduction charging for the first electric vehicle battery group and the second electric vehicle battery group.

In a possible implementation, the control module is further configured to: control, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop including the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and control, in the fourth period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop including the upper leg of the first leg, all the windings of the motor, all the upper legs of the second leg set, the first electric vehicle battery group, the second electric vehicle battery group, and the charge/discharge module, for the first electric vehicle battery group, the second electric vehicle battery group, and the motor to discharge to the charge/discharge module.

In the third period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the first electric vehicle battery group and the second electric vehicle battery group to discharge to the motor is formed. In this way, in the third period, the first electric vehicle battery group and the second electric vehicle battery group discharge to the motor, and the motor stores energy. In the fourth period, with the first switch, the second switch, the third switch, and the fourth switch controlled to turn on, the fifth switch controlled to turn off, the upper leg of the first leg and all the upper legs of the second leg set controlled to turn on, and the lower leg of the first leg and all the lower legs of the second leg set controlled to turn off, the circuit loop for the first electric vehicle battery group, the second electric vehicle battery group, and the motor to discharge to the charge/discharge module is formed. In this way, in the fourth period, the motor releases the energy stored in the third period to discharge to the charge/discharge module, and the first electric vehicle battery group and the second electric vehicle battery group also discharge to the charge/discharge module, achieving voltage-boost discharging for the first electric vehicle battery group and the second electric vehicle battery group.

In a possible implementation, the control module is further configured to: control, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop including the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and control, in the fourth period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop including the upper leg of the first leg, all the windings of the motor, all the lower legs of the second leg set, and the charge/discharge module, for the motor to discharge to the charge/discharge module.

In the third period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the first electric vehicle battery group and the second electric vehicle battery group to discharge to the motor is formed. In this way, in the third period, the first electric vehicle battery group and the second electric vehicle battery group discharge to the motor, and the motor stores energy. In the fourth period, with the first switch, the second switch, the third switch, and the fourth switch controlled to turn on, the fifth switch controlled to turn off, the lower leg of the first leg and all the upper legs of the second leg set controlled to turn on, and the upper leg of the first leg and all the lower legs of the second leg set controlled to turn off, the circuit loop for the motor to discharge to the charge/discharge module. In this way, in the fourth period, the motor releases the energy stored in the third period and discharges to the charge/discharge module is formed, that is, instead of directly discharging to the charge/discharge module, first, the first electric vehicle battery group and the second electric vehicle battery group discharge to the motor, and then the motor discharges to the charge/discharge module, achieving voltage-reduction discharging for the first electric vehicle battery group and the second electric vehicle battery group.

In a possible implementation, the first period and the second period are alternately distributed, and/or the third period and the fourth period are alternately distributed.

The energy stored by the motor in the first period is released in the second period, resulting in a gradual decrease in energy. Therefore, it is necessary for the motor to continuously store energy, that is, the first period and the second period are alternately distributed so that the motor cycles through energy storage, energy release, subsequent energy storage, and further energy release. This can ensure that the motor maintains a stable energy level. Likewise, the third period and the fourth period are also alternately distributed.

In a possible implementation, currents flowing through all the windings of the motor have equal magnitudes and identical phases.

The currents flowing through all the windings of the motor are controlled to have equal magnitudes and identical phases, so that the vibration noise of the motor can be effectively suppressed when the circuit loop of the motor is used for charging or discharging the electric vehicle battery. In addition, the electric vehicle battery voltage regulation system provided in this application does not cause the motor to operate and can solve the issue of heat generation in the motor rotor.

In a possible implementation, the motor is a three-phase motor.

According to a third aspect, a control apparatus for an electric vehicle battery voltage regulation system is provided, including a processor, the processor being configured to perform the control method according to the first aspect and any one of the possible implementations of the first aspect.

According to a fourth aspect, a power apparatus is provided, including the electric vehicle battery voltage regulation system according to the second aspect.

In the technical solution of this application, the first switch, the second switch, the third switch, the fourth switch, the fifth switch, the first leg, and the second leg set are controlled to turn on or off, so that a variety of charging and discharging circuit loops are formed among the electric vehicle battery, the motor, the bridge module, the switch assembly, and the charge/discharge module. As a result, the charging and discharging states of the electric vehicle battery are controlled, along with the voltage magnitude of the electric vehicle battery throughout the charging or discharging process. This allows for flexible charging and discharging of the electric vehicle battery, meeting charging and discharging needs of the electric vehicle battery under different conditions, thereby effectively ensuring the charging and discharging of the electric vehicle battery.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

FIG. 5 is a schematic block diagram of a control method for an electric vehicle battery voltage regulation system according to an embodiment of this application.

DESCRIPTION OF EMBODIMENTS

Figure 1:
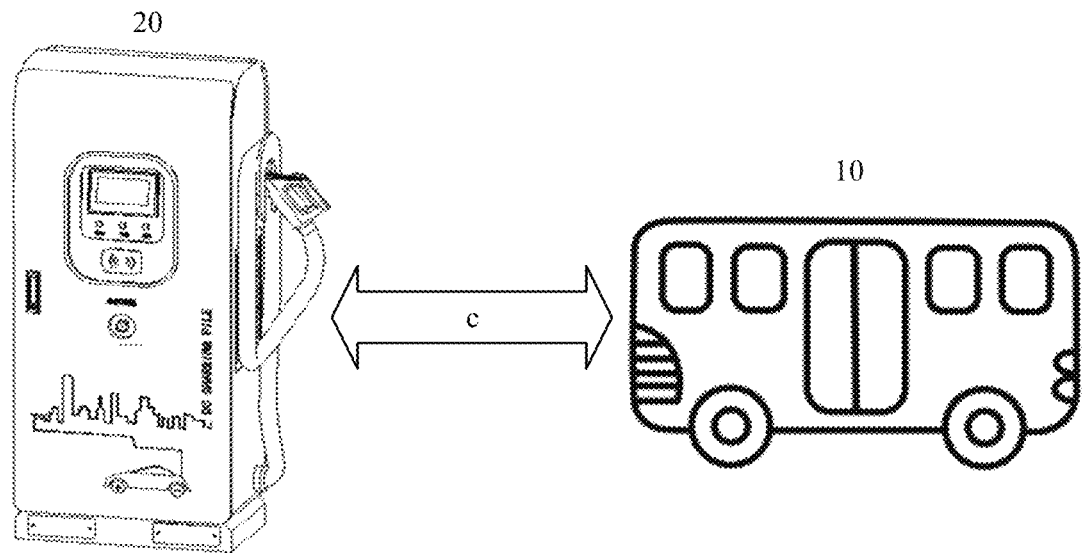
FIG. 1 is a schematic diagram of an application architecture of a charging method according to an embodiment of this application.

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "multiple" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described in this application may be combined with other embodiments.

The orientation terms appearing in the following description all are directions shown in the figures and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

Charging of electric vehicles has always been a major factor limiting electric vehicle development. In some special scenarios, the voltage and current range that charging piles can output may not match the requirements of electric vehicle batteries. For example, in low-temperature scenarios, the minimum voltage or current output by the charging pile may lead to lithium precipitation in the charging process, making it unable to properly charge the electric vehicle battery. Additionally, in some cases, power conversion may be required between the charging pile and the electric vehicle battery, such as voltage changes, current changes, power state changes, and variations in current, voltage, and power timing.

In view of this, an embodiment of this application provides a control method for an electric vehicle battery voltage regulation system. A switch assembly and a bridge module are controlled to form a variety of charging and discharging circuit loops among an electric vehicle battery, a motor, a bridge module, a switch assembly, and a charge/discharge module to meet the charging and discharging needs of the electric vehicle battery in different situations, thereby effectively ensuring the normal charging and discharging of the electric vehicle battery.

FIG. 1 is a schematic diagram of an application architecture that can be applied to a charging method according to an embodiment of this application, with solid lines representing the power line and dotted lines representing the communication line. The application architecture includes a battery management system (Battery Management System, BMS) 10 and a charging pile 20, and the BMS 10 can be connected to the charging pile 20 via a communication line to perform information exchange with the charging pile 20. For example, the communication line may be a controller area network (Controller Area Network, CAN) communication line or a daisy chain communication line.

The BMS 10 is a BMS for an electric vehicle battery, and the electric vehicle battery is a battery that provides a power source to an electric apparatus. Optionally, the electric vehicle battery may be a power storage battery. In terms of battery type, the electric vehicle battery may be a lithium-ion battery, lithium metal battery, lead-acid battery, nickel spacer battery, nickel-hydrogen battery, lithium-sulfur battery, lithium-air battery, sodium-ion battery, or the like, which is not specifically limited in the embodiments of this application. In terms of battery size, the electric vehicle battery in the embodiments of this application can be a cell/battery cell, or a battery module or battery pack, which is not specifically limited in the embodiments of this application. Optionally, the electric apparatus can be a vehicle, ship, spacecraft, or the like, which is not limited in the embodiments of this application. The BMS is a control system designed to ensure the safe operation of the electric vehicle battery. It implements functions such as charging and discharging management, high-voltage control, battery protection, battery data acquisition, and battery state evaluation. The BMS can be integrated with the electric vehicle battery in the same device/apparatus, or the BMS can be provided as a separate device/apparatus from the electric vehicle battery.

The charging pile 20, also known as a charger, is an apparatus for charging the electric vehicle battery. The charging pile may output charging power according to the charging requirements of the BMS 10, to charge the electric vehicle battery. For example, the charging pile 20 may output voltage and current according to the demand voltage and demand current sent by the BMS 10.

Figure 2:
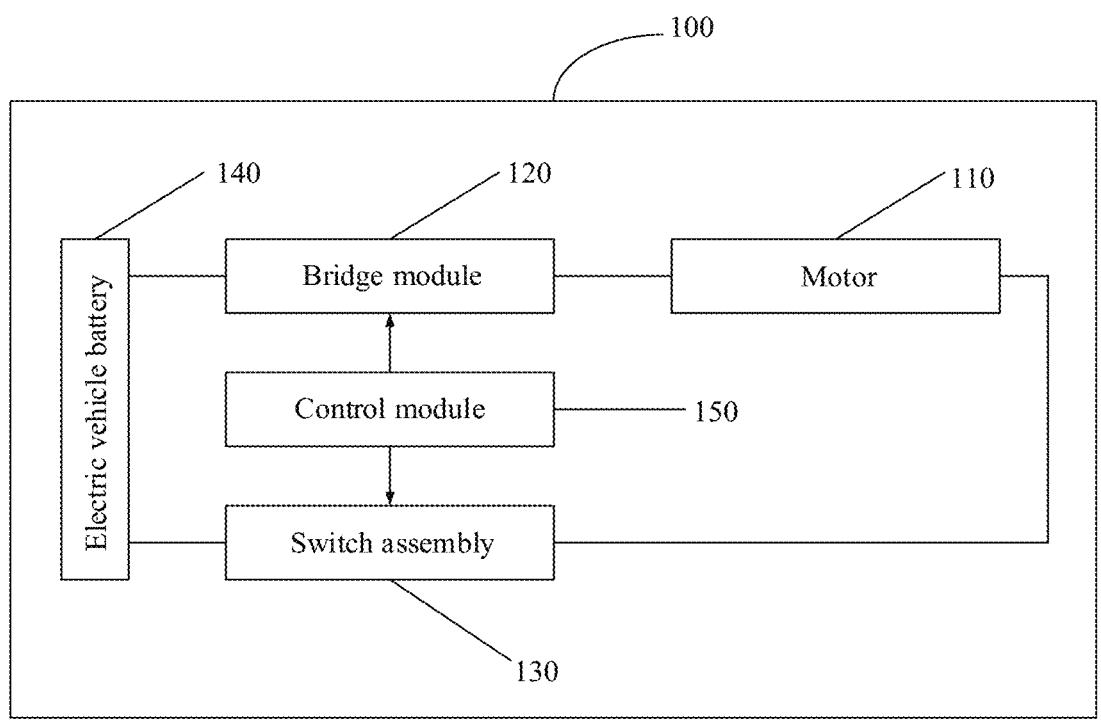
FIG. 2 is a schematic block diagram of an electric vehicle battery voltage regulation system according to an embodiment of this application.

FIG. 2 is a schematic block diagram of an electric vehicle battery voltage regulation system 100 according to an embodiment of this application. As shown in FIG. 2, the electric vehicle battery voltage regulation system 100 includes a motor 110, a bridge module 120, a switch assembly 130, an electric vehicle battery 140, and a control module 150.

The motor 110 is a rotary electromagnetic machine that operates on the electromagnetic induction principle and is configured to convert electrical energy into mechanical energy. In operating, the motor takes electric power from an electric system, and outputs mechanical power to a mechanical system. The motor 110 can be a three-phase motor or a six-phase motor.

The bridge module 120 may be implemented by an inverter in a motor drive system, where the inverter can use an insulated gate bipolar transistor (Insulated Gate Bipolar Transistor, IGBT) as a leg switch. Specifically, a quantity of legs of the inverter is the same as a quantity of windings of the motor 110. For example, the motor 110 includes three phase windings, and the inverter includes three phase legs, which are a U phase leg, a V phase leg, and a W phase leg. Each of the three phase legs has an upper leg and a lower leg, and both the upper leg and the lower leg are provided with a switch unit.

The control module 150 is configured to control switch states of the bridge module 120 and switch assembly 130, to form multiple different circuit loops among the electric vehicle battery, motor, bridge module, switch assembly, and external charge/discharge module, so as to meet charging requirements of the electric vehicle battery 140 under various conditions.

Figure 3:
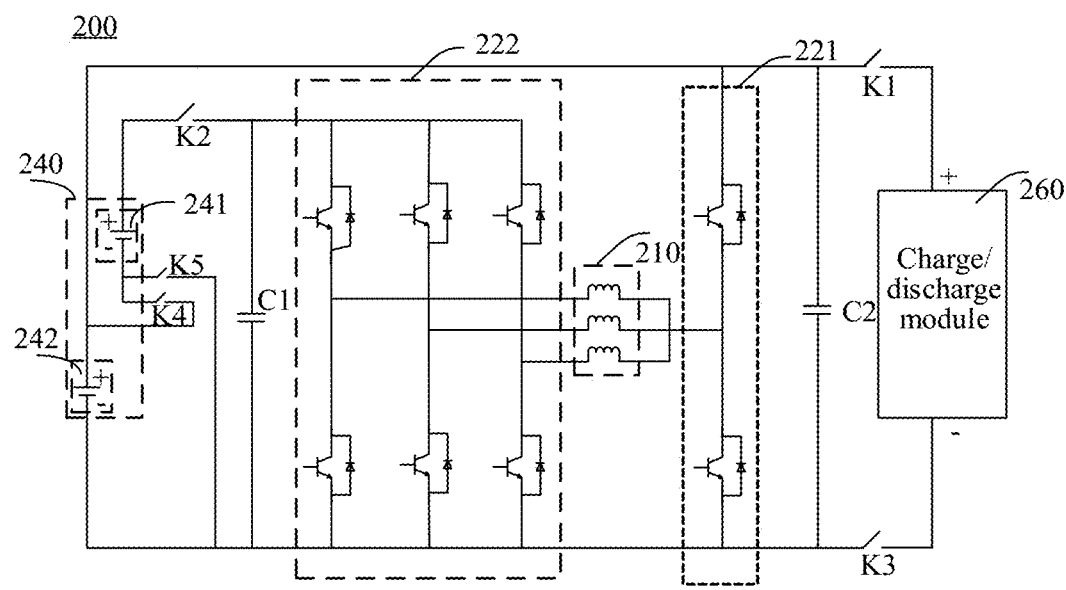
FIG. 3 is a circuit diagram of an electric vehicle battery voltage regulation system according to an embodiment of this application.

In an embodiment of this application, as shown in FIG. 3, an electric vehicle battery voltage regulation system 200 includes an electric vehicle battery 240, a motor 210, a bridge module 220, a switch assembly, and a control module 250 (not shown in the figure). The electric vehicle battery 240 includes a first electric vehicle battery group 241 and a second electric vehicle battery group 242; the bridge module 220 includes a first leg 221 and a second leg set 222, the first leg 221 and legs in the second leg set 222 each include an upper leg and a lower leg, a joint between the upper leg and the lower leg of the first leg 221 is connected to a joint of all windings of the motor 210, and joints between upper legs and lower legs of all the legs in the second leg set 222 are connected to all the windings of the motor 210, respectively; and the switch assembly includes a first switch K1, a second switch K2, a third switch K3, a fourth switch K4, and a fifth switch K5, where one end of the first switch K1 is connected to a positive terminal of a charge/discharge module 260, the other end of the first switch K1 is connected to the upper leg of the first leg 221, one end of the second switch K2 is connected to a joint of the upper legs of all the legs in the second leg set 222, the other end of the second switch K2 is connected to a positive terminal of the first electric vehicle battery group 241, one end of the third switch K3 is connected to the lower leg of the first leg 221, the other end of the third switch K3 is connected to a negative terminal of the charge/discharge module 260, one end of the fourth switch K4 is connected to a negative terminal of the first electric vehicle battery group 241, the other end of the fourth switch K4 is connected to a positive terminal of the second electric vehicle battery group 242, one end of the fifth switch K5 is connected to the negative terminal of the first electric vehicle battery group 241, and the other end of the fifth switch K5 is connected to a joint of the lower legs of all the legs in the second leg set 222.

The control module 250 is configured to: control the first switch K1, the second switch K2, the third switch K3, the fourth switch K4, the fifth switch K5, the first leg 221, and the second leg set 222 to turn on or off, to form in a first period a circuit loop for the charge/discharge module 260 to discharge to the motor 210 and to form in a second period a circuit loop for the charge/discharge module 260 and the motor 210 to charge the first electric vehicle battery group 241 and the second electric vehicle battery group 242 or form in the second period a circuit loop for the motor 210 to charge the first electric vehicle battery group 241 and the second electric vehicle battery group 242; or control the first switch K1, the second switch K2, the third switch K3, the fourth switch K4, the fifth switch K5, the first leg 221, and the second leg set 222 to turn on or off, to form in a third period a circuit loop for the first electric vehicle battery group 241 and the second electric vehicle battery group 242 to discharge to the motor 210 and to form in a fourth period a circuit loop for the first electric vehicle battery group 241, the second electric vehicle battery group 242, and the motor 210 to discharge to the charge/discharge module 260 or form in the fourth period a circuit loop for the motor 210 to discharge to the charge/discharge module 260.

Optionally, in this embodiment of this application, the charge/discharge module can be a charging pile that provides charging power for the electric vehicle battery, or another electric vehicle battery of electric vehicle, or another load, which is not limited in this application.

With the first switch, the second switch, the third switch, the fourth switch, the fifth switch, the first leg, and the second leg set controlled to turn on or off, a variety of charging and discharging circuit loops are formed among the electric vehicle battery, the motor, the bridge module, the switch assembly, and the charge/discharge module. As a result, the charging and discharging states of the electric vehicle battery are controlled, along with the voltage magnitude of the electric vehicle battery throughout the charging or discharging process. This allows for flexible charging and discharging of the electric vehicle battery, meeting charging and discharging needs of the electric vehicle battery under different conditions, thereby effectively ensuring the charging and discharging of the electric vehicle battery.

Figure 4:
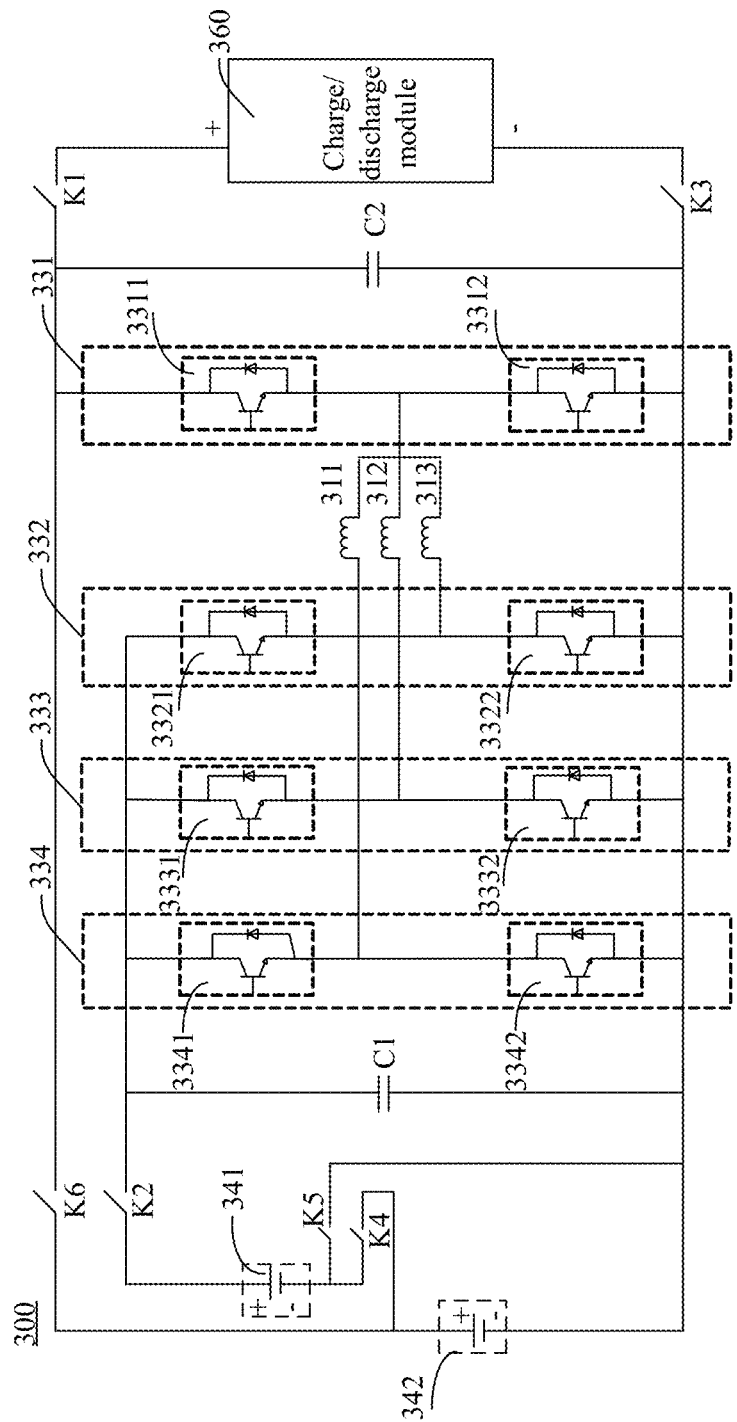
FIG. 4 is a circuit diagram of an electric vehicle battery voltage regulation system according to an embodiment of this application.

The following details a circuit diagram of an electric vehicle battery voltage regulation system 300 provided in an embodiment of this application, with reference to FIG. 4.

As shown in FIG. 4, a motor is a three-phase motor, and three windings of the three-phase motor are a winding 311, a winding 312, and a winding 313. A bridge module includes a first leg 331 and a second leg set, and the second leg set includes a second leg 332, a third leg 333, and a fourth leg 334. A switch assembly includes a first switch K1, a second switch K2, a third switch K3, a fourth switch K4, and a fifth switch K5. an electric vehicle battery includes a first electric vehicle battery group 341 and a second electric vehicle battery group 342.

Specifically, a joint between an upper leg 3321 and a lower leg 3322 of the second leg 332 is connected to one end of the winding 313, a joint between an upper leg 3331 and a lower leg 3332 of the third leg 333 is connected to one end of the winding 312, a joint between an upper leg 3341 and a lower leg 3342 of the fourth leg 334 is connected to one end of the winding 311, and a joint between an upper leg 3311 and a lower leg 3312 of the first leg 331 is connected to the other end of the winding 311, the other end of the winding 312, and the other end of the winding 313. One end of the first switch K1 is connected to a positive terminal of a charge/discharge module 360, and the other end of the first switch K1 is connected to the upper leg 3311 of the first leg 331; one end of the second switch K2 is connected to the upper leg 3341 of the fourth leg 334, and the other end of the second switch K2 is connected to a positive terminal of the first electric vehicle battery group 341; one end of the third switch K3 is connected to the lower leg 3312 of the first leg 331, and the other end of the third switch K3 is connected to a negative terminal of the charge/discharge module 360; one end of the fourth switch K4 is connected to a negative terminal of the first electric vehicle battery group 341, and the other end of the fourth switch K4 is connected to a positive terminal of the second electric vehicle battery group 342; and one end of the fifth switch K5 is connected to the negative terminal of the first electric vehicle battery group 341, and the other end of the fifth switch K5 is connected to the lower leg 3342 of the fourth leg 334.

In this embodiment of this application, in a first period, the first switch K1, the second switch K2, the third switch K3, and the fourth switch K4 are controlled to turn on, the fifth switch K5 is controlled to turn off, the upper leg 3311 of the first leg 331, the lower leg 3322 of the second leg 332, the lower leg 3332 of the third leg 333, and the lower leg 3342 of the fourth leg 334 are controlled to turn on, and the lower leg 3312 of the first leg 331, the upper leg 3321 of the second leg 332, the upper leg 3331 of the third leg 333, and the upper leg 3341 of the fourth leg 334 are controlled to turn off, to form a circuit loop including the upper leg 3311 of the first leg 331, the winding 311, the winding 312, the winding 313, the lower leg 3322 of the second leg 332, the lower leg 3332 of the third leg 333, the lower leg 3342 of the fourth leg 334, and the charge/discharge module 360; and in a second period, the first switch K1, the second switch K2, the third switch K3, and the fourth switch K4 are controlled to turn on, the fifth switch K5 is controlled to turn off, the upper leg 3311 of the first leg 331, the upper leg 3321 of the second leg 332, the upper leg 3331 of the third leg 333, and the upper leg 3341 of the fourth leg 334 are controlled to turn on, and the lower leg 3312 of the first leg 331, the lower leg 3322 of the second leg 332, the lower leg 3332 of the third leg 333, and the lower leg 3342 of the fourth leg 334 are controlled to turn off, to form a circuit loop including the upper leg 3311 of the first leg 331, the winding 311, the winding 312, the winding 313, the upper leg 3321 of the second leg 332, the upper leg 3331 of the third leg 333, the upper leg 3341 of the fourth leg 334, the first electric vehicle battery group 341, the second electric vehicle battery group 342, and the charge/discharge module 360.

In the first period, with the first switch K1, the second switch K2, the third switch K3, and the fourth switch K4 controlled to turn on, the fifth switch K5 controlled to turn off, the upper leg 3311 of the first leg 331, the lower leg 3322 of the second leg 332, the lower leg 3332 of the third leg 333, and the lower leg 3342 of the fourth leg 334 controlled to turn on, and the lower leg 3312 of the first leg 331, the upper leg 3321 of the second leg 332, the upper leg 3331 of the third leg 333, and the upper leg 3341 of the fourth leg 334 controlled to turn off, the circuit loop for the charge/discharge module 360 to discharge to the motor is formed. In this way, in the first period, the charge/discharge module 360 discharges to the motor, and the motor stores energy. In the second period, with the first switch K1, the second switch K2, the third switch K3, and the fourth switch K4 controlled to turn on, the fifth switch K5 controlled to turn off, the upper leg 3311 of the first leg 331, the upper leg 3321 of the second leg 332, the upper leg 3331 of the third leg 333, and the upper leg 3341 of the fourth leg 334 controlled to turn on, and the lower leg 3312 of the first leg 331, the lower leg 3322 of the second leg 332, the lower leg 3332 of the third leg 333, and the lower leg 3342 of the fourth leg 334 controlled to turn off, the circuit loop for both the charge/discharge module 360 and the motor to charge the first electric vehicle battery group 341 and the second electric vehicle battery group 342 is formed. In this way, in the second period, the motor releases the energy stored in the first period to charge the first electric vehicle battery group 341 and the second electric vehicle battery group 342, and the charge/discharge module 360 also charges the first electric vehicle battery group 341 and the second electric vehicle battery group 342, thereby achieving voltage-boost charging for the first electric vehicle battery group 341 and the second electric vehicle battery group 342.

In another embodiment of this application, in a first period, the first switch K1, the second switch K2, the third switch K3, and the fourth switch K4 are controlled to turn on, the fifth switch K5 is controlled to turn off, the upper leg 3311 of the first leg 331, the lower leg 3322 of the second leg 332, the lower leg 3332 of the third leg 333, and the lower leg 3342 of the fourth leg 334 are controlled to turn on, and the lower leg 3312 of the first leg 331, the upper leg 3321 of the second leg 332, the upper leg 3331 of the third leg 333, and the upper leg 3341 of the fourth leg 334 are controlled to turn off, to form a circuit loop including the upper leg 3311 of the first leg 331, the winding 311, the winding 312, the winding 313, the lower leg 3322 of the second leg 332, the lower leg 3332 of the third leg 333, the lower leg 3342 of the fourth leg 334, and the charge/discharge module 360, for the charge/discharge module 360 to discharge to the motor; and in a second period, the first switch K1, the second switch K2, the third switch K3, and the fourth switch K4 are controlled to turn on, the fifth switch K5 is controlled to turn off, the lower leg 3312 of the first leg 331, the upper leg 3321 of the second leg 332, the upper leg 3331 of the third leg 333, and the upper leg 3341 of the fourth leg 334 are controlled to turn on, and the upper leg 3311 of the first leg 331, the lower leg 3322 of the second leg 332, the lower leg 3332 of the third leg 333, and the lower leg 3342 of the fourth leg 334 are controlled to turn off, to form a circuit loop including the lower leg 3312 of the first leg 331, the winding 311, the winding 312, the winding 313, the upper leg 3321 of second leg 332, the upper leg 3331 of third leg 333, the upper leg 3341 of the fourth leg 334, the first electric vehicle battery group 341, and the second electric vehicle battery group 342.

In the first period, with the first switch K1, the second switch K2, the third switch K3, and the fourth switch K4 controlled to turn on, the fifth switch K5 controlled to turn off, the upper leg 3311 of the first leg 331, the lower leg 3322 of the second leg 332, the lower leg 3332 of the third leg 333, and the lower leg 3342 of the fourth leg 334 controlled to turn on, and the lower leg 3312 of the first leg 331, the upper leg 3321 of the second leg 332, the upper leg 3331 of the third leg 333, and the upper leg 3341 of the fourth leg 334 controlled to turn off, the circuit loop for the charge/discharge module 360 to discharge to the motor is formed. In this way, in the first period, the charge/discharge module 360 discharges to the motor, and the motor stores energy. In the second period, with the first switch K1, the second switch K2, the third switch K3, and the fourth switch K4 controlled to turn on, the fifth switch K5 controlled to turn off, the lower leg 3312 of the first leg 331, the upper leg 3321 of the second leg 332, the upper leg 3331 of the third leg 333, and the upper leg 3341 of the fourth leg 334 controlled to turn on, and the upper leg 3311 of the first leg 331, the lower leg 3322 of the second leg 332, the lower leg 3332 of the third leg 333, and the lower leg 3342 of the fourth leg 334 controlled to turn off, the circuit loop for the motor to charge the first electric vehicle battery group 341 and the second electric vehicle battery group 342 is formed. In this way, in the second period, the motor releases the energy stored in the first period to charge the first electric vehicle battery group 341 and the second electric vehicle battery group 342, that is, instead of directly charging the first electric vehicle battery group 341 and the second electric vehicle battery group 342, first, the charge/discharge module 360 discharges to the motor, and then the motor charges the first electric vehicle battery group 341 and the second electric vehicle battery group 342, achieving voltage-reduction charging for the first electric vehicle battery group 341 and second electric vehicle battery group 342.

In an embodiment of this application, in a third period, the first switch K1, the second switch K2, the third switch K3, and the fourth switch K4 are controlled to turn on, the fifth switch K5 is controlled to turn off, the lower leg 3312 of the first leg 331, the upper leg 3321 of the second leg 332, the upper leg 3331 of the third leg 333, and the upper leg 3341 of the fourth leg 334 are controlled to turn on, and the upper leg 3311 of the first leg 331, the lower leg 3322 of the second leg 332, the lower leg 3332 of the third leg 333, and the lower leg 3342 of the fourth leg 334 are controlled to turn off, to form a circuit loop including the lower leg 3312 of the first leg 331, the winding 311, the winding 312, the winding 313, the upper leg 3321 of the second leg 332, the upper leg 3331 of the third leg 333, the upper leg 3341 of the fourth leg 334, the first electric vehicle battery group 341, and the second electric vehicle battery group 342; and in a fourth period, the first switch K1, the second switch K2, the third switch K3, and the fourth switch K4 are controlled to turn on, the fifth switch K5 is controlled to turn off, the upper leg 3311 of the first leg 331, the upper leg 3321 of the second leg 332, the upper leg 3331 of the third leg 333, and the upper leg 3341 of the fourth leg 334 are controlled to turn on, and the lower leg 3312 of the first leg 331, the lower leg 3322 of the second leg 332, the lower leg 3332 of the third leg 333, and the lower leg 3342 of the fourth leg 334 are controlled to turn off, to form a circuit loop including the upper leg 3311 of the first leg 331, the winding 311, the winding 312, the winding 313, the upper leg 3321 of the second leg 332, the upper leg 3331 of the third leg 333, the upper leg 3341 of the fourth leg 334, the first electric vehicle battery group 341, the second electric vehicle battery group 342, and the charge/discharge module 360.

In the third period, with the first switch K1, the second switch K2, the third switch K3, and the fourth switch K4 controlled to turn on, the fifth switch K5 controlled to turn off, the lower leg 3312 of the first leg 331, the upper leg 3321 of the second leg 332, the upper leg 3331 of the third leg 333, and the upper leg 3341 of the fourth leg 334 controlled to turn on, and the upper leg 3311 of the first leg 331, the lower leg 3322 of the second leg 332, the lower leg 3332 of the third leg 333, and the lower leg 3342 of the fourth leg 334 controlled to turn off, the circuit loop for the first electric vehicle battery group 341 and the second electric vehicle battery group 342 to discharge to the motor is formed. In this way, in the third period, the first electric vehicle battery group 341 and the second electric vehicle battery group 342 discharge to the motor, and the motor stores energy. In the fourth period, with the first switch K1, the second switch K2, the third switch K3, and the fourth switch K4 controlled to turn on, the fifth switch K5 controlled to turn off, the upper leg 3311 of the first leg 331, the upper leg 3321 of the second leg 332, the upper leg 3331 of the third leg 333, and the upper leg 3341 of the fourth leg 334 controlled to turn on, and the lower leg 3312 of the first leg 331, the lower leg 3322 of the second leg 332, the lower leg 3332 of the third leg 333, and the lower leg 3342 of the fourth leg 334 controlled to turn off, the circuit loop for the first electric vehicle battery group 341, the second electric vehicle battery group 342, and the motor to discharge to the charge/discharge module 360 is formed. In this way, in the fourth period, the motor releases the energy stored in the third period to discharge to the charge/discharge module 360, and the first electric vehicle battery group 341 and the second electric vehicle battery group 342 also discharge to the charge/discharge module 360, achieving voltage-boost discharging of the first electric vehicle battery group 341 and the second electric vehicle battery group 342.

In another embodiment of this application, in a third period, the first switch K1, the second switch K2, the third switch K3, and the fourth switch K4 are controlled to turn on, the fifth switch K5 is controlled to turn off, the lower leg 3312 of the first leg 331, the upper leg 3321 of the second leg 332, the upper leg 3331 of the third leg 333, and the upper leg 3341 of the fourth leg 334 are controlled to turn on, and the upper leg 3311 of the first leg 331, the lower leg 3322 of the second leg 332, the lower leg 3332 of the third leg 333, and the lower leg 3342 of the fourth leg 334 are controlled to turn off, to form a circuit loop including the lower leg 3312 of the first leg 331, the winding 311, the winding 312, the winding 313, the upper leg 3321 of the second leg 332, the upper leg 3331 of the third leg 333, the upper leg 3341 of the fourth leg 334, the first electric vehicle battery group 341, and the second electric vehicle battery group 342; and in a fourth period, the first switch K1, the second switch K2, the third switch K3, and the fourth switch K4 are controlled to turn on, the fifth switch K5 is controlled to turn off, the upper leg 3311 of the first leg 331, the lower leg 3322 of the second leg 332, the lower leg 3332 of the third leg 333, and the lower leg 3342 of the fourth leg 334 are controlled to turn on, and the lower leg 3312 of the first leg 331, the upper leg 3321 of the second leg 332, the upper leg 3331 of the third leg 333, and the upper leg 3341 of the fourth leg 334 are controlled to turn off, to form a circuit loop including the upper leg 3311 of the first leg 331, the winding 311, the winding 312, the winding 313, the lower leg 3322 of the second leg 332, the lower leg 3332 of the third leg 333, the lower leg 3342 of the fourth leg 334, and the charge/discharge module 360.

With the first switch K1, the second switch K2, the third switch K3, and the fourth switch K4 controlled to turn on, the fifth switch K5 controlled to turn off, the lower leg 3312 of the first leg 331, the upper leg 3321 of the second leg 332, the upper leg 3331 of the third leg 333, and the upper leg 3341 of the fourth leg 334 controlled to turn on, and the upper leg 3311 of the first leg 331, the lower leg 3322 of the second leg 332, the lower leg 3332 of the third leg 333, and the lower leg 3342 of the fourth leg 334 controlled to turn off, the circuit loop for the first electric vehicle battery group 341 and the second electric vehicle battery group 342 to discharge to the motor is formed. In this way, in the third period, the first electric vehicle battery group 341 and the second electric vehicle battery group 342 discharge to the motor, and the motor stores energy. In the fourth period, with the first switch K1, the second switch K2, the third switch K3, and the fourth switch K4 controlled to turn on, the fifth switch K5 controlled to turn off, the upper leg 3311 of the first leg 331, the lower leg 3322 of the second leg 332, the lower leg 3332 of the third leg 333, and the lower leg 3342 of the fourth leg 334 controlled to turn on, and the lower leg 3312 of the first leg 331, the upper leg 3321 of the second leg 332, the upper leg 3331 of the third leg 333, and the upper leg 3341 of the fourth leg 334 controlled to turn off, the circuit loop for the motor to discharge to the charge/discharge module 360 is formed. In this way, in the fourth period, the motor releases the energy stored in the third period to discharge to the charge/discharge module 360, that is, instead of directly discharging to the charge/discharge module 360, first, the first electric vehicle battery group 341 and the second electric vehicle battery group 342 discharge to the motor, and then the motor discharges to the charge/discharge module 360, achieving voltage-reduction discharging of the first electric vehicle battery group 341 and the second electric vehicle battery group 342.

In an embodiment of this application, the first period and the second period are alternately distributed, and/or the third period and the fourth period are alternately distributed.

The energy stored by the motor in the first period is released in the second period, resulting in a gradual decrease in energy. Therefore, it is necessary for the motor to continuously store energy, that is, the first period and the second period are alternately distributed so that the motor cycles through energy storage, energy release, subsequent energy storage, and further energy release. This can ensure that the motor maintains a stable energy level, sufficient for charging the first electric vehicle battery group and the second electric vehicle battery group or for discharging to the charge/discharge module. Likewise, the third period and the fourth period are also alternately distributed.

In an embodiment of this application, currents flowing through all the windings of the motor have equal magnitudes and identical phases.

Optionally, the currents flowing through the windings 311, 312, and 313 of the three-phase motor have equal magnitudes and identical phases.

The magnetomotive force of a unidirectional winding is a pulse magnetomotive force that is distributed in a stepped manner in space and that changes alternately with a change pattern of current in time. Magnetomotive forces of three single-phase windings of a three-phase motor are superposed to obtain a resultant magnetic field of the three phase windings. Generally, currents flowing through three phase windings of a three-phase motor in a heating process are not quite the same in magnitude, currents flowing through two phase windings have a phase difference of 180°, and two phase currents having no phase difference are the same in magnitude. This may lead to mutual asymmetry of three phases in the currents flowing through the windings of the motor and high vibration noise of the motor caused by high current frequency in a process of heating the electric vehicle battery. In this application, with the currents flowing through all the windings of the motor controlled to have equal magnitudes and identical phases, the vibration noise generated when the electric vehicle battery is charged or discharged using the circuit loop of the motor is effectively suppressed. In addition, this control ensures that the motor does not operate, thereby solving the problem of heat generation in the motor rotor.

Optionally, the currents flowing through the windings of the motor may be modulated into direct current or alternating current by using a space vector pulse width modulation (Space Vector Pulse Width Modulation, SVPWM) algorithm.

It should be noted that when direct current is applied to the windings of the motor, a radial electromagnetic force of the motor is reduced, and eddy-current loss of the rotor of the motor is reduced. Consequently, less heat is generated by the rotor. Therefore, when direct current is applied to the windings of the motor, less heat is generated by the rotor of the motor, and electromagnetic vibration noise is reduced.

Optionally, the electric vehicle battery voltage regulation systems shown in FIGS. 3 and 4 further include capacitor C1 connected in parallel with the charge/discharge module and capacitor C2 connected in parallel with the second leg set. The capacitors primarily serve the purpose of stabilizing the voltage and filtering out noise wave.

Optionally, in the electric vehicle battery voltage regulation system 300 as shown in FIG. 4, the switch assembly may further include a sixth switch K6, one end of which is connected to the upper leg 3311 of the first leg 331, and the other end of which is connected to the positive terminal of the second electric vehicle battery group 342.

Specifically, the first switch K1, the third switch K3, and the fourth switch K4 are controlled to turn off, and the second switch K2, the fifth switch K5, and the sixth switch K6 are controlled to turn on. In this case, the first electric vehicle battery group 341 and the second electric vehicle battery group 342 are connected in parallel. In a fifth period, the lower leg 3312 of the first leg 331, the upper leg 3321 of the second leg 332, the upper leg 3331 of the third leg 333, and the upper leg 3341 of the fourth leg 334 are controlled to turn on, and the upper leg 3311 of the first leg 331, the lower leg 3322 of the second leg 332, the lower leg 3332 of the third leg 333, and the lower leg 3342 of the fourth leg 334 are controlled to turn off, to form a circuit loop including the first electric vehicle battery group 341, the lower leg 3312 of the first leg 331, the upper leg 3321 of the second leg 332, the upper leg 3331 of the third leg 333, the upper leg 3341 of the fourth leg 334, the winding 311, the winding 312, and the winding 313. In the circuit loop, the first electric vehicle battery group 341 discharges to the motor and the motor stores energy. In a sixth period, the upper leg 3311 of the first leg 331, the lower leg 3322 of the second leg 332, the lower leg 3332 of the third leg 333, and the lower leg 3342 of the fourth leg 334 are controlled turn on, and the lower leg 3312 of the first leg 331, the upper leg 3321 of the second leg 332, the upper leg 3331 of the third leg 333, and the upper leg 3341 of the fourth leg 334 are controlled to turn off, to form a circuit loop including the second electric vehicle battery group 342, the upper leg 3311 of the first leg 331, the lower leg 3322 of the second leg 332, the lower leg 3332 of the third leg 333, the lower leg 3342 of the fourth leg 334, the winding 311, the winding 312, and the winding 313. In the circuit loop, the motor releases the energy stored in the fifth period, to the second electric vehicle battery group 342, thereby realizing energy exchange between the first electric vehicle battery group 341 and the second electric vehicle battery group 342. In the energy exchange process, as current flows through the first electric vehicle battery group 341 and the second electric vehicle battery group 342, the first electric vehicle battery group 341 and the second electric vehicle battery group 342 generate heat energy. This enables energy exchange between the electric vehicle battery groups through the motor circuit loop, resulting in the heating of the electric vehicle battery groups.

The foregoing describes in detail the electric vehicle battery voltage regulation system according to the embodiments of this application, and in the following, a control method of the electric vehicle battery voltage regulation system according to an embodiment of this application is described in detail with reference to FIG. 5. The technical features described in the apparatus embodiments are applicable to the following method embodiment.

FIG. 5 illustrates a schematic block diagram of a control method 400 for an electric vehicle battery voltage regulation system according to an embodiment of this application. The electric vehicle battery voltage regulation system is any one of the electric vehicle battery voltage regulation systems described above. The control method 400 may be performed by a control module in the electric vehicle battery voltage regulation system, for example, a VCU and/or a motor controller. The control method 400 includes the following steps.

S410. Control the first switch, the second switch, the third switch, the fourth switch, the fifth switch, the first leg, and the second leg set to turn on or off, to form in the first period a circuit loop for the charge/discharge module to discharge to the motor and to form in the second period a circuit loop for the charge/discharge module and the motor to charge the first electric vehicle battery group and the second electric vehicle battery group or form in the second period a circuit loop for the motor to charge the first electric vehicle battery group and the second electric vehicle battery group.

S420. Control the first switch, the second switch, the third switch, the fourth switch, the fifth switch, the first leg, and the second leg set to turn on or off, to form in the third period a circuit loop for the first electric vehicle battery group and the second electric vehicle battery group to discharge to the motor and to form in the fourth period a circuit loop for the first electric vehicle battery group, the second electric vehicle battery group, and the motor to discharge to the charge/discharge module or form in the fourth period a circuit loop for the motor to discharge to the charge/discharge module.

With the first switch, the second switch, the third switch, the fourth switch, the fifth switch, the first leg, and the second leg set controlled to turn on or off, a variety of charging and discharging circuit loops are formed among the electric vehicle battery, the motor, the bridge module, the switch assembly, and the charge/discharge module. As a result, the charging and discharging states of the electric vehicle battery are controlled, along with the voltage magnitude of the electric vehicle battery throughout the charging or discharging process. This allows for flexible charging and discharging of the electric vehicle battery, meeting charging and discharging needs of the electric vehicle battery under different conditions, thereby effectively ensuring the charging and discharging of the electric vehicle battery.

In an embodiment of this application, in the first period, the first switch, the second switch, the third switch, and the fourth switch are controlled to turn on, the fifth switch is controlled to turn off, the upper leg of the first leg and all the lower legs of the second leg set are controlled to turn on, and the lower leg of the first leg and all the upper legs of the second leg set are controlled to turn off, to form a circuit loop including the upper leg of the first leg, all the windings of the motor, all the lower legs of the second leg set, and the charge/discharge module, for the charge/discharge module to discharge to the motor; and in the second period, the first switch, the second switch, the third switch, and the fourth switch are controlled to turn on, the fifth switch is controlled to turn off, the upper leg of the first leg and all the upper legs of the second leg set are controlled to turn on, and the lower leg of the first leg and all the lower legs of the second leg set are controlled to turn off, to form a circuit loop including the upper leg of the first leg, all the windings of the motor, all the upper legs of the second leg set, the first electric vehicle battery group, the second electric vehicle battery group, and the charge/discharge module, for the charge/discharge module and the motor to charge the first electric vehicle battery group and the second electric vehicle battery group.

In an embodiment of this application, in the first period, the first switch, the second switch, the third switch, and the fourth switch are controlled to turn on, the fifth switch is controlled to turn off, the upper leg of the first leg and all the lower legs of the second leg set are controlled to turn on, and the lower leg of the first leg and all the upper legs of the second leg set are controlled to turn off, to form a circuit loop including the upper leg of the first leg, all the windings of the motor, all the lower legs of the second leg set, and the charge/discharge module, for the charge/discharge module to discharge to the motor; and in the second period, the first switch, the second switch, the third switch, and the fourth switch are controlled to turn on, the fifth switch is controlled to turn off, the lower leg of the first leg and all the upper legs of the second leg set are controlled to turn on, and the upper leg of the first leg and all the lower legs of the second leg set are controlled to turn off, to form a circuit loop including the lower leg of the first leg, all the windings of the motor, all the upper legs of the second leg set, the first electric vehicle battery group, and the second electric vehicle battery group, for the motor to charge the first electric vehicle battery group and the second electric vehicle battery group.

In an embodiment of this application, in the third period, the first switch, the second switch, the third switch, and the fourth switch are controlled to turn on, the fifth switch is controlled to turn off, the lower leg of the first leg and all the upper legs of the second leg set are controlled to turn on, and the upper leg of the first leg and all the lower legs of the second leg set are controlled to turn off, to form a circuit loop including the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and in the fourth period, the first switch, the second switch, the third switch, and the fourth switch are controlled to turn on, the fifth switch is controlled to turn off, the upper leg of the first leg and all the upper legs of the second leg set are controlled to turn on, and the lower leg of the first leg and all the lower legs of the second leg set are controlled to turn off, to form a circuit loop including the upper leg of the first leg, all the windings of the motor, all the upper legs of the second leg set, the first electric vehicle battery group, the second electric vehicle battery group, and the charge/discharge module, for the first electric vehicle battery group, the second electric vehicle battery group, and the motor to discharge to the charge/discharge module.

In an embodiment of this application, in the third period, the first switch, the second switch, the third switch, and the fourth switch are controlled to turn on, the fifth switch is controlled to turn off, the lower leg of the first leg and all the upper legs of the second leg set are controlled to turn on, and the upper leg of the first leg and all the lower legs of the second leg set are controlled to turn off, to form a circuit loop including the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and in the fourth period, the first switch, the second switch, the third switch and the fourth switch are controlled to turn on, the fifth switch is controlled to turn off, the upper leg of the first leg and all the lower legs of the second leg set are controlled to turn on, and the lower leg of the first leg and all the upper legs of the second leg set are controlled to turn off, to form a circuit loop including the upper leg of the first leg, all windings of the motor, all the lower legs of the second leg set, and the charge/discharge module, for the motor to discharge to the charge/discharge module.

In an embodiment of this application, the first period and the second period are alternately distributed, and/or the third period and the fourth period are alternately distributed.

In an embodiment of this application, currents flowing through all the windings of the motor have equal magnitudes and identical phases.

In an embodiment of this application, the motor is a three-phase motor.

Optionally, the motor may alternatively be a six-phase motor.

Figure 6:
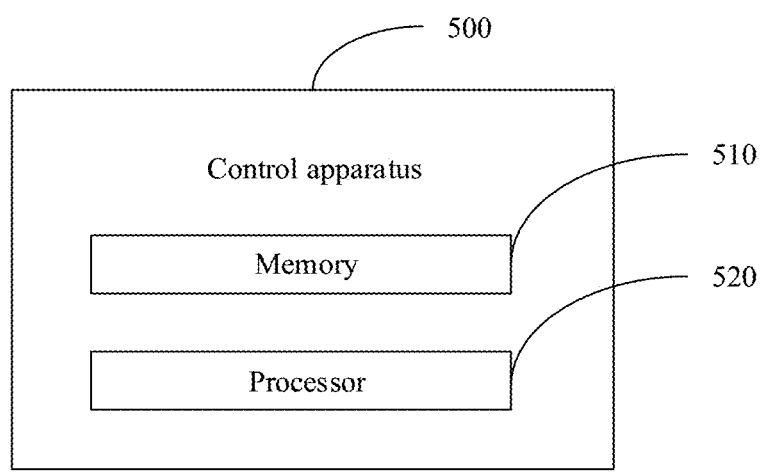
FIG. 6 is a schematic structural diagram of a control apparatus for an electric vehicle battery voltage regulation system according to an embodiment of this application.

FIG. 6 is a schematic block diagram of a control apparatus 500 for an electric vehicle battery voltage regulation system according to an embodiment of this application. As shown in FIG. 6, the control apparatus 500 includes a processor 520. Optionally, the control apparatus 500 further includes a memory 510. The memory 510 is configured to store instructions. The processor 520 is configured to read the instructions and perform the methods of the foregoing various embodiments of this application according to the instructions.

Optionally, the processor 520 corresponds to the control module in any one of the above electric vehicle battery voltage regulation systems.

Optionally, an embodiment of this application further provides a power apparatus. The power apparatus includes any one of the above electric vehicle battery voltage regulation systems, the electric vehicle battery voltage regulation system being configured to control charging or discharging of the electric vehicle battery, and the electric vehicle battery being configured to provide power to the power apparatus.

Optionally, the power apparatus is an electric vehicle.

An embodiment of this application further provides a readable storage medium configured to store a computer program, where the computer program is used for performing the method of all the foregoing embodiments of this application.

Persons of ordinary skill in the art will appreciate that the units and algorithm steps of various examples described with reference to the embodiments disclosed in this specification can be implemented by using electronic hardware or a combination of computer software and electronic hardware. Whether the functions are executed by hardware or software depends on particular applications and design constraints of the technical solutions. Persons skilled in the art can employ a different method to implement the described functions for each particular application, but such implementations shall not be construed as going beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely illustrative. For example, the unit division is merely logical function division and other division manners may be used in actual implementation. For example, a plurality of units or components may be combined or integrated into another system, or some features may be ignored or not be performed. In addition, the displayed or discussed mutual couplings, direct couplings or communication connections may be indirect couplings or communication connections through some interfaces, apparatuses, or units, and may be in electrical, mechanical, or other forms.

The units described as separate parts may or may not be physically separate. Parts displayed as units may or may not be physical units, meaning they may be located in one position or distributed on a plurality of network units. Some or all of the units may be selected depending on actual requirements to achieve the objectives of the solutions of the embodiments.

In addition, function units in the embodiments of this application may be integrated into one processing unit, or each of the units may exist alone physically, or two or more units may be integrated into one unit.

When realized in form of software functional unit and sold or used as an independent product, the function may also be stored in a computer-readable storage medium. Based on such an understanding, the technical solutions of this application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of this application but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

The invention claimed is:

1. A control method for an electric vehicle battery voltage regulation system, characterized in that the electric vehicle battery voltage regulation system comprises an electric vehicle battery, a motor, a bridge module, and a switch assembly; wherein the electric vehicle battery comprises a first electric vehicle battery group and a second electric vehicle battery group;

the bridge module comprises a first leg and a second leg set, the first leg and all legs in the second leg set each comprise an upper leg and a lower leg, a joint between the upper leg and the lower leg of the first leg is connected to a joint of all windings of the motor, and joints between upper legs and lower legs of all the legs in the second leg set are connected to all the windings of the motor, respectively; and the switch assembly comprises a first switch, a second switch, a third switch, a fourth switch, and a fifth switch, wherein one end of the first switch is connected to a positive terminal of a charge/discharge module, the other end of the first switch is connected to the upper leg of the first leg, one end of the second switch is connected to a joint of the upper legs of all the legs in the second leg set, the other end of the second switch is connected to a positive terminal of the first electric vehicle battery group, one end of the third switch is connected to the lower leg of the first leg, the other end of the third switch is connected to a negative terminal of the charge/discharge module, one end of the fourth switch is connected to a negative terminal of the first electric vehicle battery group, the other end of the fourth switch is connected to a positive terminal of the second electric vehicle battery group, one end of the fifth switch is connected to the negative terminal of the first electric vehicle battery group, and the other end of the fifth switch is connected to a joint of the lower legs of all the legs in the second leg set; and the control method comprises:

controlling the first switch, the second switch, the third switch, the fourth switch, the fifth switch, the first leg, and the second leg set to turn on or off, to form in a first period a circuit loop for the charge/discharge module to discharge to the motor and to form in a second period a circuit loop for the charge/discharge module and the motor to charge the first electric vehicle battery group and the second electric vehicle battery group or form in the second period a circuit loop for the motor to charge the first electric vehicle battery group and the second electric vehicle battery group; or controlling the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module or form in the fourth period a circuit loop for the motor to discharge to the charge/discharge module.

2. The control method according to claim 1, characterized in that the controlling the first switch, the second switch, the third switch, the fourth switch, the fifth switch, the first leg, and the second leg set to turn on or off, to form in a first period a circuit loop for the charge/discharge module to discharge to the motor and to form in a second period a circuit loop for the charge/discharge module and the motor to charge the first electric vehicle battery group and the second electric vehicle battery group comprises:

controlling, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop comprising the upper leg of the first leg, all the windings of the motor, all the lower legs of the second leg set, and the charge/discharge module, for the charge/discharge module to discharge to the motor; and controlling, in the second period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop comprising the upper leg of the first leg, all the windings of the motor, all the upper legs of the second leg set, the first electric vehicle battery group, the second electric vehicle battery group, and the charge/discharge module, for the charge/discharge module and the motor to charge the first electric vehicle battery group and the second electric vehicle battery group.

3. The control method according to claim 1, characterized in that the controlling the first switch, the second switch, the third switch, the fourth switch, the fifth switch, the first leg, and the second leg set to turn on or off, to form in a first period a circuit loop for the charge/discharge module to discharge to the motor and to form in the second period a circuit loop for the motor to charge the first electric vehicle battery group and the second electric vehicle battery group comprises:

controlling, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop comprising the upper leg of the first leg, all the windings of the motor, all the lower legs of the second leg set, and the charge/discharge module, for the charge/discharge module to discharge to the motor; and controlling, in the second period, the first switch, the second switch, the third switch, and the fourth switch to turn on, the fifth switch to turn off, the lower leg of the first leg, and all the upper legs of the second leg set to turn on, and the upper leg of the first leg and all the lower legs of the second leg set to turn off, to form a circuit loop comprising the lower leg of the first leg, all the windings of the motor, all the upper legs of the second leg set, the first electric vehicle battery group, and the second electric vehicle battery group, for the motor to charge the first electric vehicle battery group and the second electric vehicle battery group.

4. The control method according to claim 1, characterized in that the controlling the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module comprises:

controlling, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop comprising the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and controlling, in the fourth period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop comprising the upper leg of the first leg, all the windings of the motor, all the upper legs of the second leg set, the first electric vehicle battery group, the second electric vehicle battery group, and the charge/discharge module, for the first electric vehicle battery group, the second electric vehicle battery group, and the motor to discharge to the charge/discharge module.

5. The control method according to claim 1, characterized in that the controlling the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in the fourth period a circuit loop for the motor to discharge to the charge/discharge module comprises:

controlling, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop comprising the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and controlling, in the fourth period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop comprising the upper leg of the first leg, all the windings of the motor, all the lower legs of the second leg set, and the charge/discharge module, for the motor to discharge to the charge/discharge module.

6. The control method according to claim 1, characterized in that the first period and the second period are alternately distributed, and/or the third period and the fourth period are alternately distributed.

7. The control method according to claim 1, characterized in that currents flowing through all the windings of the motor have equal magnitudes and identical phases.

8. The control method according to claim 1, characterized in that the motor is a three-phase motor.

9. A control apparatus for an electric vehicle battery voltage regulation system, characterized by comprising a processor, the processor being configured to perform the control method according to claim 1.

10. An electric vehicle battery voltage regulation system characterized by comprising an electric vehicle battery, a motor, a bridge module, a switch assembly, and a control module; wherein the electric vehicle battery comprises a first electric vehicle battery group and a second electric vehicle battery group;

the bridge module comprises a first leg and a second leg set, the first leg and all legs in the second leg set each comprise an upper leg and a lower leg, a joint between the upper leg and the lower leg of the first leg is connected to a joint of all windings of the motor, and joints between upper legs and lower legs of all the legs in the second leg set are connected to all the windings of the motor, respectively; and the switch assembly comprises a first switch, a second switch, a third switch, a fourth switch, and a fifth switch, wherein one end of the first switch is connected to a positive terminal of a charge/discharge module, the other end of the first switch is connected to the upper leg of the first leg, one end of the second switch is connected to a joint of the upper legs of all the legs in the second leg set, the other end of the second switch is connected to a positive terminal of the first electric vehicle battery group, one end of the third switch is connected to the lower leg of the first leg, the other end of the third switch is connected to a negative terminal of the charge/discharge module, one end of the fourth switch is connected to a negative terminal of the first electric vehicle battery group, the other end of the fourth switch is connected to a positive terminal of the second electric vehicle battery group, one end of the fifth switch is connected to the negative terminal of the first electric vehicle battery group, and the other end of the fifth switch is connected to a joint of the lower legs of all the legs in the second leg set; and the control module is configured to:

control the first switch, the second switch, the third switch, the fourth switch, the fifth switch, the first leg, and the second leg set to turn on or off, to form in a first period a circuit loop for the charge/discharge module to discharge to the motor and to form in a second period a circuit loop for the charge/discharge module and the motor to charge the first electric vehicle battery group and the second electric vehicle battery group or form in the second period a circuit loop for the motor to charge the first electric vehicle battery group and the second electric vehicle battery group; or control the first switch, the second switch, the third switch, the fourth switch, the fifth switch, the first leg, and the second leg set to turn on or off, to form in a third period a circuit loop for the first electric vehicle battery group and the second electric vehicle battery group to discharge to the motor and to form in a fourth period a circuit loop for the first electric vehicle battery group, the second electric vehicle battery group, and the motor to discharge to the charge/discharge module or form in the fourth period a circuit loop for the motor to discharge to the charge/discharge module.

11. The electric vehicle battery voltage regulation system according to claim 10, characterized in that
the control module is configured to:
control, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop comprising the upper leg of the first leg, all the windings of the motor, all the lower legs of the second leg set, and the charge/discharge module, for the charge/discharge module to discharge to the motor; and
control, in the second period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop comprising the upper leg of the first leg, all the windings of the motor, all the upper legs of the second leg set, the first electric vehicle battery group, the second electric vehicle battery group, and the charge/discharge module, for the charge/discharge module and the motor to charge the first electric vehicle battery group and the second electric vehicle battery group.

12. The electric vehicle battery voltage regulation system according to claim 10, characterized in that
the control module is configured to:
control, in the first period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop comprising the upper leg of the first leg, all the windings of the motor, all the lower legs of the second leg set, and the charge/discharge module, for the charge/discharge module to discharge to the motor; and
control, in the second period, the first switch, the second switch, the third switch, and the fourth switch to turn on, the fifth switch to turn off, the lower leg of the first leg, and all the upper legs of the second leg set to turn on, and the upper leg of the first leg and all the lower legs of the second leg set to turn off, to form a circuit loop comprising the lower leg of the first leg, all the windings of the motor, all the upper legs of the second leg set, the first electric vehicle battery group, and the second electric vehicle battery group, for the motor to charge the first electric vehicle battery group and the second electric vehicle battery group.

13. The electric vehicle battery voltage regulation system according to claim 10, characterized in that the control module is further configured to:
control, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop comprising the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and
control, in the fourth period, the first switch, the second switch, the third switch, and the fourth switch to turn on, the fifth switch to turn off, the upper leg of the first leg and all the upper legs of the second leg set to turn on, and the lower leg of the first leg and all the lower legs of the second leg set to turn off, to form a circuit loop comprising the upper leg of the first leg, all the windings of the motor, all the upper legs of the second leg set, the first electric vehicle battery group, the second electric vehicle battery group, and the charge/discharge module, for the first electric vehicle battery group, the second electric vehicle battery group, and the motor to discharge to the charge/discharge module.

14. The electric vehicle battery voltage regulation system according to claim 10, characterized in that the control module is further configured to:
control, in the third period, the first switch, the second switch, the third switch, and the fourth switch to turn on, the fifth switch to turn off, the lower leg of the first leg and all the upper legs of the second leg set to turn on, and the upper leg of the first leg and all the lower legs of the second leg set to turn off, to form a circuit loop comprising the lower leg of the first leg, all the windings of the motor, all the upper legs of the second leg set, the first electric vehicle battery group, and the second electric vehicle battery group, for the first electric vehicle battery group and the second electric vehicle battery group to discharge to the motor; and
control, in the fourth period, the first switch, the second switch, the third switch, and the fourth switch to turn on, the fifth switch to turn off, the upper leg of the first leg and all the lower legs of the second leg set to turn on, and the lower leg of the first leg and all the upper legs of the second leg set to turn off, to form a circuit loop comprising the upper leg of the first leg, all the windings of the motor, all the lower legs of the second leg set, and the charge/discharge module, for the motor to discharge to the charge/discharge module.

15. The electric vehicle battery voltage regulation system according to claim 10, characterized in that the first period and the second period are alternately distributed, and/or the third period and the fourth period are alternately distributed.

16. The electric vehicle battery voltage regulation system according to claim 10, characterized in that currents flowing through all the windings of the motor have equal magnitudes and identical phases.

17. The electric vehicle battery voltage regulation system according to claim 10, characterized in that the motor is a three-phase motor.

18. A power apparatus characterized by comprising the electric vehicle battery voltage regulation system according to claim 10, the electric vehicle battery voltage regulation system being configured to control charging or discharging of the electric vehicle battery, and the electric vehicle battery being configured to provide power to the power apparatus.

* * * * *